(12) United States Patent
Vannithamby

(10) Patent No.: US 8,494,542 B2
(45) Date of Patent: Jul. 23, 2013

(54) METHOD AND APPARATUS FOR MOBILE STATION-ASSISTED LOAD BALANCING IN WIRELESS PACKET DATA NETWORKS

(75) Inventor: Rath Vannithamby, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 829 days.

(21) Appl. No.: 11/018,360

(22) Filed: Dec. 21, 2004

(65) Prior Publication Data
US 2006/0135173 A1 Jun. 22, 2006

(51) Int. Cl.
*H04W 72/00* (2009.01)

(52) U.S. Cl.
USPC ........ 455/453; 455/450; 455/452.2; 455/436; 455/437; 455/438; 455/439; 455/440; 455/441; 455/442; 370/331; 370/332

(58) Field of Classification Search
USPC ....... 455/453, 436–442, 450, 452.2; 370/331, 370/332
See application file for complete search history.

(56) References Cited

U.S. PATENT DOCUMENTS

| | | | | |
|---|---|---|---|---|
| 6,069,871 | A * | 5/2000 | Sharma et al. | 370/209 |
| 6,542,736 | B1 * | 4/2003 | Parkvall et al. | 455/452.2 |
| 6,757,520 | B2 * | 6/2004 | Attar et al. | 455/63.1 |
| 6,968,192 | B2 * | 11/2005 | Longoni | 455/453 |
| 2002/0119779 | A1 * | 8/2002 | Ishikawa et al. | 455/437 |
| 2002/0128013 | A1 * | 9/2002 | Declerck et al. | 455/436 |
| 2003/0083069 | A1 * | 5/2003 | Vadgama | 455/436 |
| 2004/0038682 | A1 * | 2/2004 | Persson et al. | 455/436 |
| 2005/0007974 | A1 * | 1/2005 | Vasudevan et al. | 370/320 |
| 2005/0020273 | A1 * | 1/2005 | Fong et al. | 455/453 |

(Continued)

FOREIGN PATENT DOCUMENTS

| | | |
|---|---|---|
| EP | 1349410 | 10/2003 |
| EP | 1351539 | 10/2003 |
| WO | WO 02/067603 | 8/2002 |

OTHER PUBLICATIONS

3GPP: "3GPP TR 25.891 v0.3.0 (Feb. 2003) 3$^{rd}$ Generation Partnership Project; Technical Specification Group Radio Access Network; Improvement of RRM Across RNS/BSS (Post Rel-5); (Release 6)," Jun. 18, 2003, pp. 1-17, XP002376681.
Lucent Technologies, Ballot Comments for: IS-2000.3C, Apr. 2002, 9 pages.

(Continued)

*Primary Examiner* — Patrick Edouard
*Assistant Examiner* — Shantell L Heiber
(74) *Attorney, Agent, or Firm* — Coats & Bennett, P.L.L.C.

(57) ABSTRACT

A wireless communication network makes intelligent accept/reject decisions responsive to sector selection requests by mobile stations based on sharing per-sector loading information and per-sector mobile station received signal quality information. For example, the signal quality and sector loading information for each sector in a given mobile station's active set of sectors can be evaluated to determine whether the sector targeted by the mobile station for selection as its new serving sector for high-speed packet data service is the "best" sector for serving the mobile station. The network can identify the "best" serving sector based on one or more metrics. If the targeted sector is not the best one for serving the mobile station, the network sends a reject message, or it may send a redirect message pointing the mobile station to the best serving sector. The disclosed accept/reject processing advantageously applies to cdma2000 and W-CDMA networks, for example.

21 Claims, 5 Drawing Sheets

U.S. PATENT DOCUMENTS

| | | | |
|---|---|---|---|
| 2005/0101328 A1* | 5/2005 | Son et al. | 455/436 |
| 2005/0124347 A1* | 6/2005 | Hosein | 455/446 |
| 2005/0201331 A1* | 9/2005 | Gaal et al. | 370/332 |
| 2006/0009158 A1* | 1/2006 | Bernhard et al. | 455/67.11 |
| 2006/0104229 A1* | 5/2006 | Vannithamby | 370/328 |

OTHER PUBLICATIONS

Schumacher, Motorola, $3^{rd}$ Generation Partnership Project 2 3GGPP2, "Cell Selection Enhancement: Stage 3 text", 2003, 8 pages.

* cited by examiner

METHOD AND APPARATUS FOR MOBILE STATION-ASSISTED LOAD BALANCING IN WIRELESS PACKET DATA NETWORKS

BACKGROUND OF THE INVENTION

The present invention generally relates to wireless communication networks, and particularly relates to load balancing in wireless packet data networks.

Current and evolving wireless communication networks offer a range of packet data services. The push toward higher data rates led to the introduction of shared, high-speed packet data channels in several of the current wireless communication network standards. The IS-2000 standards for cdma2000 networks introduced the high-rate Forward Packet Data Channel (F-PDCH), for example, and the W-CDMA standards introduced the High Speed Downlink Packet Access (HSDPA) channel.

Several subscribers (mobile stations) simultaneously share a F-PDCH (or HSDPA channel), and each one is served on the channel via time-multiplexed delivery of per-subscriber data. Some form of "scheduler" manages the multiplexed delivery of data according to one or more service criteria, such as by prioritizing delivery to subscribers in good radio conditions with maximum throughput as the scheduling goal, or by prioritizing delivery to subscribers that are underserved relative to their prevailing radio conditions with "fairness" of service as the scheduling goal.

In a typical cdma2000-based network offering F-PDCH services, each radio sector transmits the F-PDCH, and individual mobile stations are served on the F-PDCH in the radio sector that currently provides the "best" signal quality. Each mobile station dynamically monitors the signal quality from its serving sector and from the other sectors in its "active set" of radio sectors that are candidates for serving it on the F-PDCH.

If the signal quality from one of the candidate sectors becomes better than that of its current serving sector, the mobile station selects that candidate sector as its new serving sector and signals that reselection to the network. In turn, the base station controller or other entity managing the involved radio sectors coordinates the transfer of that mobile station's packet data traffic from the F-PDCH of the old serving sector to the F-PDCH of the new serving sector.

Mobile stations receiving packet data traffic the F-PDCH thus "move" toward the best signal strength and, ultimately, end up selecting the radio sector offering them the best signal strength. Of course, the radio sector offering the best signal strength to a given mobile station is not always the best F-PDCH serving sector for that mobile station.

Indeed, the F-PDCH in that sector already may be heavily loaded, or there may be a relatively large number of dedicated channel users operating in that sector—mobile stations engaged in circuit-switched voice or low-rate data services—which reduces the transmit power and spreading code availability for the F-PDCH. In short, mobile stations autonomously selecting and reselecting serving sectors for F-PDCH service based simply on following the best radio sector signal strength leave the supporting wireless packet data network vulnerable to potentially significant congestion and efficiency problems.

SUMMARY OF THE INVENTION

The present invention comprises a method and apparatus to control radio sector congestion in a wireless communication network by accepting or rejecting serving-sector selection requests by mobile stations based on evaluating sector loading information shared among the radio sectors. For example, in one embodiment, the present invention comprises sharing sector loading information among a given set of radio sectors that are candidates for providing high-speed packet data service to a given mobile station, and accepting or rejecting a serving sector selection request by the mobile station targeting a particular one in the set of sectors based on evaluating the sector loading information. In this context, "accepting" a request can be implicitly done simply by not rejecting or redirecting the request.

In one embodiment of the above method, the selection request is denied if the evaluation of shared information indicates that another sector in the set is a more preferred serving sector target. Another sector may be more preferred for one or more reasons. For example, another sector may be preferred if it is less congested than the one targeted by the mobile station's selection request, if its selection would better balance overall congestion among the set, if its selection would provide higher packet data throughput to the mobile station, or if its selection would make more efficient use of available communication resources. Of course, the present invention is not limited to any one or more of these examples, and other bases for making intelligent accept/reject decisions in the network are contemplated herein.

Generally, however, the present invention provides a method of controlling sector congestion by managing autonomous sector selections by a mobile station being served on a high-speed packet data channel. That congestion management is based on sharing sector loading information and signal quality information among a set of radio sectors in a wireless communication network, and selectively accepting or rejecting a sector-selection request by the mobile station based on evaluating the shared sector loading information and signal quality information. The signal quality information represents the received signal quality at the mobile station for each sector, and may be obtained from Periodic Pilot Strength Measurement Messages (PPSMMs) sent by the mobile station, or from like messaging. In a cdma2000 embodiment, the mobile station can be configured to mix in non-serving sector Channel Quality Indicator (CQI) reports with the serving sector CQI reports it normally sends.

The set of sectors preferably comprises the mobile station's active set, or some subset thereof, representing those radio sectors in the wireless communication network that currently are candidates for serving the mobile station on the high-speed packet data channel. The mobile station signals a sector selection request targeting a given one of those radio sectors for selection as its new serving sector, and the network makes an intelligent accept/reject (or redirect) decision responsive to that request based on evaluating per-sector loading information and per-sector signal quality for each sector in the set. The decision can be made in the radio base station providing the target radio sector, the radio base station providing the source radio sector (the current serving sector), or in a base station controller supporting the target or source radio base stations.

While the specific information shared among radio sectors is not fixed herein, the present invention contemplates certain items of information as being particularly useful for evaluating congestion across the sectors. For example, in a cdma2000-based network, the radio sectors may share sector loading information comprising forward and/or reverse link loading estimates, Walsh code usage for the sector's Forward Packet Data Channel (F-PDCH) used to provide high-speed packet data service on the sector's forward link, transmit power usage for the sector's F-PDCH, and, optionally, the type of F-PDCH scheduler in use at the sector. Note that, since different scheduler types offer potentially different scheduling goals, one type of scheduler might be preferred over another type for a given mobile station's subscriber profile. With such information shared among the different radio sectors, the target radio base station (and/or the mobile station's currently serving radio base station) can make an intelligent decision about whether to accept or reject the mobile station's requested serving sector change.

Accept/reject processing may include the use of so-called "Universal Handoff Direction Messages" (UHDM) in cdma2000-based embodiments, or the use of similar messages in other embodiments based on other network standards. By sending a UHDM message to the mobile station instead of a simple reject message, a given radio base station not only rejects the mobile station's sector selection request, it removes the targeted sector from the mobile station's active set, thereby denying it as a selection target. As a further expansion of the method, the radio base station may send a redirect message in association with sending a reject message, or in lieu of sending a reject message. The redirect message tells the mobile station that there is a radio sector in its active set that is more preferred for serving the mobile station than the sector targeted by the mobile station's sector selection request.

The above congestion control and variations of that control can be implemented in one or more congestion control circuits, which may comprise processing circuits included in the individual radio base stations, or included in a base station controller providing support and control for a plurality of radio base stations. If congestion control circuits are implemented at the radio-base-station level, then backhaul signaling between the radio base stations and their supporting base station controllers can be used to share the sector congestion information. Sidehaul signaling between the radio base stations and/or their supporting base station controllers also can be used as needed, and such signaling can be carried over the air interfaces and/or over dedicated sidehaul links. By way of non-limiting example, cdma2000-based networks provide A3/A7 sidehaul links between base station controllers that can be used to share radio sector loading information between radio sectors associated with different base station controllers.

The present invention contemplates several approaches to managing the signaling overhead associated with information sharing as described herein. For example, the sector loading information from each base station may be sent responsive to the mobile station initiating serving sector reselection—i.e., triggered information sharing. With this approach, the information is shared when needed. Alternatively, the base stations can be configured to periodically send sector loading information, so that reasonably current per-sector loading information is available from each one of the base stations.

If triggered information sharing is used, the mobile stations can be configured to send a special signal quality report in advance of signaling sector selection requests, or in conjunction with signaling such requests. The special signal quality report serves the twofold purpose of providing the network with the per-sector received signal quality information needed to make an intelligent accept/reject decision regarding the signaled sector selection request, plus receipt of the report can be used as the triggering mechanism for sharing sector loading information.

Of course, the present invention is not limited to the above features and advantages. Those skilled in the art will recognize additional features and advantages upon reading the following description and upon viewing the accompanying drawings.

DETAILED DESCRIPTION OF THE INVENTION

Figure 1:
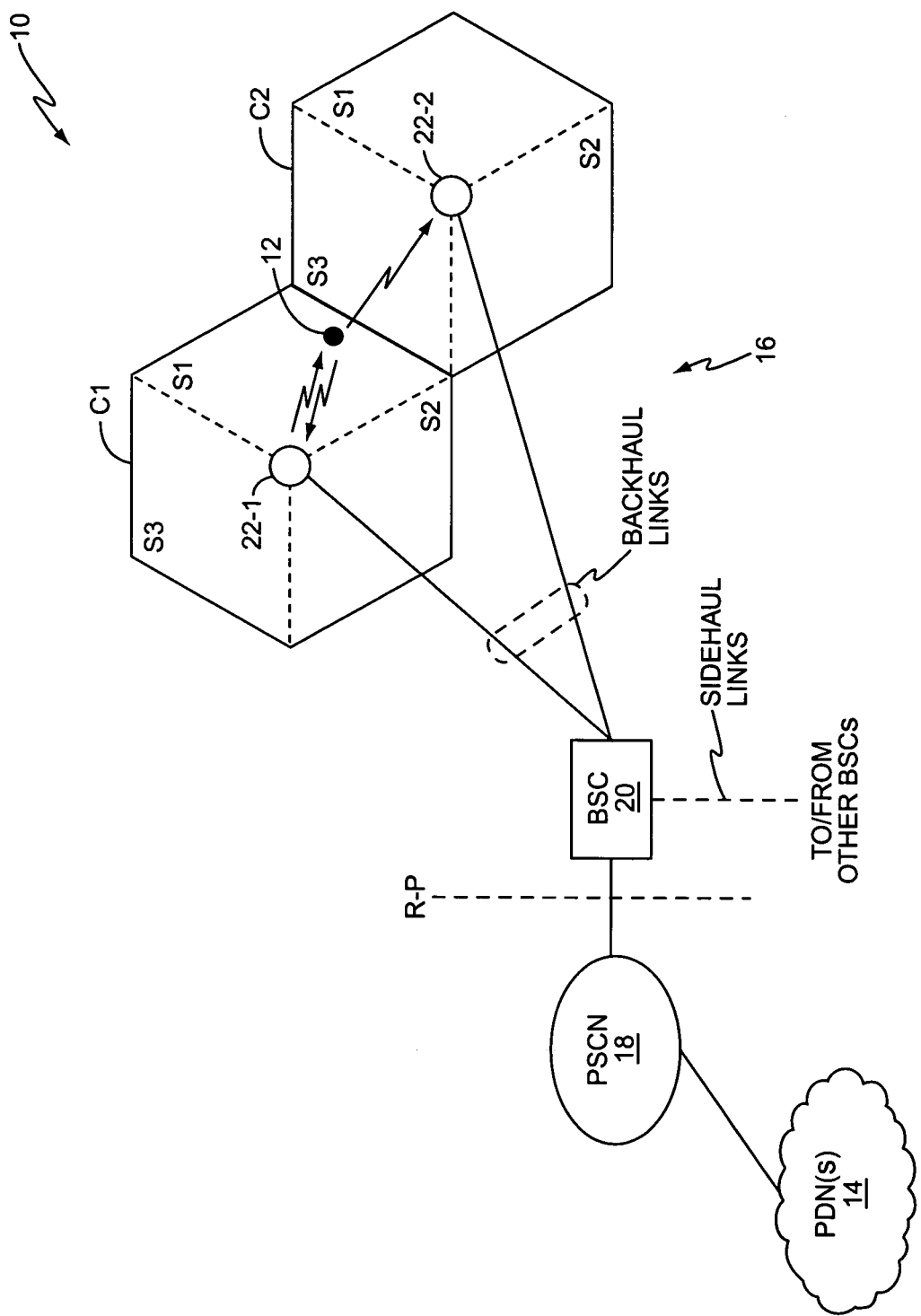
FIG. 1 is a diagram of a wireless communication network according to one or more embodiments of the present invention.

FIG. 1 illustrates a wireless communication network 10 that communicatively couples mobile stations 12 to one or more Public Data Networks (PDNs) 14, such as the Internet. The illustrated network 10 comprises a Radio Access Network (RAN) 16 coupled to a Packet Switched Core Network (PSCN) 18 through a Radio-Packet (R-P) interface. RAN 16 comprises one or more Base Station Controllers (BSCs) 20, each supporting one or more sectorized Radio Base Stations (RBSs) 22, also referred to as "Base Transceiver Stations" (BTSs). Those skilled in the art will appreciate that network 10 may comprise additional entities not illustrated, such as location registration servers, authentication servers, etc. Also, it should be understood that a reduced number of BSCs 20, RBSs 22, and mobile stations 12 are illustrated for simplicity.

Network 10 can be configured according to any number of wireless communication standards, although the present invention contemplates particular applicability to wireless networks based on cdma200 standards (IS-2000), including 1×EV-DV and 1×EV-DO configurations, and those based on W-CDMA standards.

In any case, wireless network 10 provides high-speed packet data services in a plurality of radio sectors. For example, if network 10 comprises a cdma2000 network, then it can be configured to provide high-speed packet data services on a F-PDCH broadcast in the cellular coverage areas of RBSs 22-1 and 22-2. Specifically, the F-PDCH signal can be transmitted in each of the radio sectors provided by RBS 22-1 and in those provided by RBS 22-2. For convenience of discussion, the radio sectors of RBSs 22-1 and 22-2 can be identified by the illustrated Sector:Cell designations. Thus, the radio sectors of RBS 22-1 are identified as S1:C1, S2:C1, and S3:C1. Similarly, the radio sectors of RBS 22-2 are identified as S1:C2, S2:C2, and S3:C2.

Assuming the illustrated mobile station 12 is being served on the F-PDCH (or like high-speed channel), it generally is desirable to serve the mobile station 12 from the best one of the radio sectors currently available for serving it. Indeed, in a conventional cdma2000-based network, for example, a given mobile station is served on the F-PDCH from only one radio sector at a time. The mobile station tracks the received signal quality for radio sectors in its "active set" and signals new serving sector selections to the network responsive to changing reception conditions at the mobile station. Such behavior results in the mobile station simply changing its serving sector selection based on deciding which active set sector currently offers it the best received signal quality. (In this context, the "active set" sectors generally represent those radio sectors that currently are candidates for serving the mobile station on the F-PDCH.)

Figure 2:
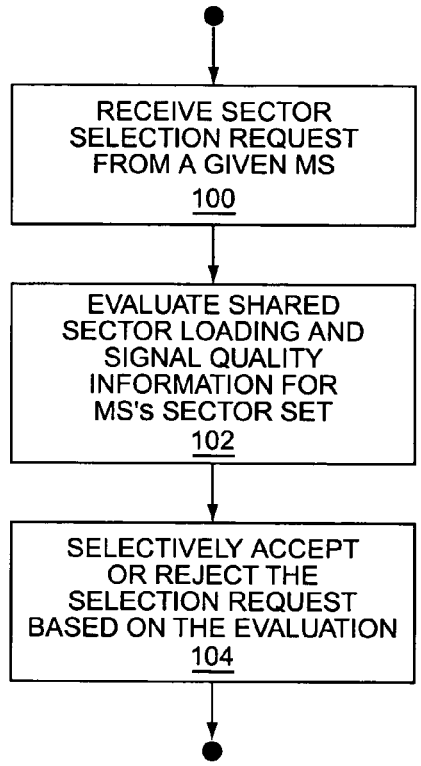
FIG. 2 is a diagram of sector selection request processing logic according to one or more embodiments of the present invention.

FIG. 2 illustrates general processing logic for network 10, standing in contrast to the conventional sector selection processing just described. Processing begins with receiving a sector selection request from mobile station 12 (Step 100), indicating that it wishes to change its serving sector selection from a source radio sector (i.e., the current serving sector) to a target radio sector (i.e., the new serving sector desired by the mobile station 12).

Processing continues with evaluating shared sector loading information and signal quality information for the mobile station's active set of sectors (Step 102). The mobile station's sector selection request is selectively accepted or rejected based on the evaluation of the shared per-sector information. Broadly, the evaluation can be based on accepting the request if doing so would not violate any sector congestion constraints that exist for the targeted radio sector, or otherwise rejecting the request. Thus, the mobile station 12 can still make autonomous sector selection decisions but the network 10 can accept or reject its sector selection requests to control network congestion, with the network's request processing informed by the use of per-sector loading and signal quality information for the involved radio sectors.

Figure 3:
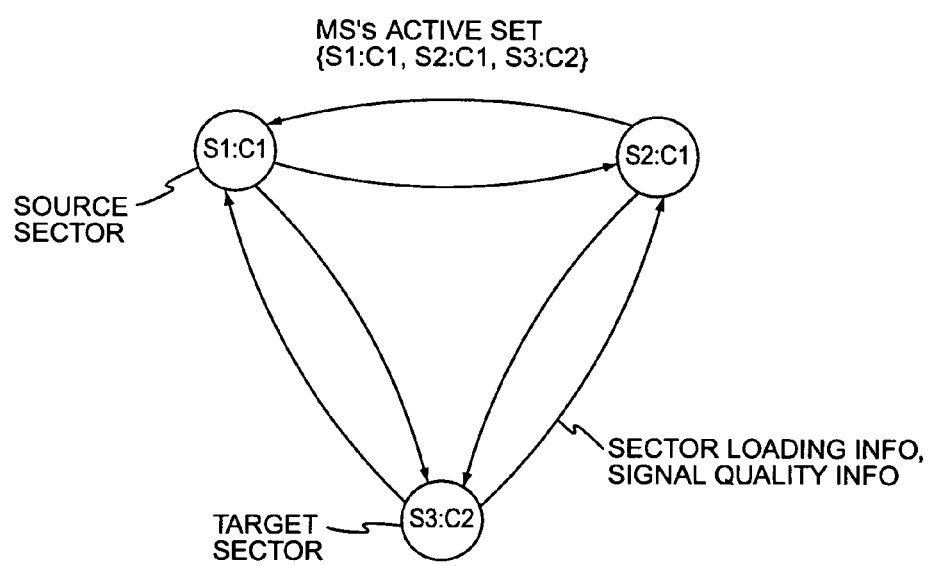
FIG. 3 is diagram of information sharing signal flow between multiple radio sectors of the network of FIG. 1.

FIG. 3 illustrates such information sharing where the involved set of radio sectors is the mobile station's active sector set. For discussion purposes, the active set of mobile station 12 comprises {S1:C1, S2:C1, S3:C2}. Assuming that S1:C1 is the mobile station's current serving sector—the source—and that the mobile station 12 sends a selection request message indicating that it is targeting S3:C2 as its new serving sector, one sees that the network 10 can make an intelligent accept/reject decision for that request based on sharing sector loading and signal quality information among all three involved sectors. Thus, radio sector S1:C1 exchanges information (directly or indirectly) with radio sectors S2:C1 and S3:C2, radio sector S2:C1 exchanges information with radio sectors S1:C1 and S3:C2, and so on.

In one embodiment, the radio base station 22 providing the source radio sector makes the accept/reject decision and signals that decision to the mobile station 12. For example, it may send a reject message to the mobile station 12, or it may signal the radio base station 22 that provides the targeted radio sector, in which case the reject message can be sent from the target sector. Such messaging may be explicit, such as by sending an actual accept or reject message, or can be implicit, such as by not acknowledging the mobile station's request, or by not providing the requested changeover of packet data traffic from the high-speed channel in the source sector to the high-speed channel in the target sector.

Information sharing signaling supporting the above accept/reject processing can be supported over one or more interfaces. For example, RBSs 22 can share information between them by exchanging such information through the supporting BSC 20 via the RBS-to-BSC backhaul links. If the involved radio sectors involve different BSCs 20, information sharing signaling can be carried out over the sidehaul links interconnecting the BSCs 20. For example, the A3/A7 sidehaul links defined by the IS-2000 standards for cdma2000 networks can be used to share per-sector information. In some embodiments, the RBSs 22 can signal each other directly, such as by signaling through the Abis interface—i.e., over-the-air signaling. Other signaling methods are also contemplated by the present invention, but may depend on the configuration and capabilities of the particular network architecture being considered.

The present invention contemplates sharing one or more per-sector parameters or values. For example, the sector-specific information shared between the sectors may comprise one or more of a transmit power availability for the high-speed packet data channel, a spreading code availability for the high-speed packet data channel, a forward-link load estimate, a reverse-link load estimate, and scheduler type information for the high-speed packet data channel. Reverse-link load estimates may be based on reverse link noise power (rise-over-thermal) estimates, the number/type of users, or some other metrics. Likewise, forward link loading may be expressed based on the number/type of forward link users—e.g., broadcast service users, voice users, low-rate data users, high-rate data users, etc.

In particular, since cdma2000-based RBSs use whatever transmit power and spreading codes are "leftover" after making all dedicated channel allocations, the sector loading information preferably includes values indicating how transmit power is available for the transmitting sector's F-PDCH signal, and how many appropriate-length Walsh codes are available for multi-coding the sector's F-PDCH signal. Both parameters directly limit the maximum data rate achievable on the sector's F-PDCH and thus represent valuable information in terms of deciding whether one sector versus another should be used to serve a given mobile station 12.

Regardless of the particulars, information sharing between the radio sectors may be configured to occur on a periodic basis, so that each sector remains apprised of changing conditions in the other involved sectors. Because each mobile station's active set of sectors is potentially different, the sectors involved for each given mobile station 12 can be different. However, any sectors that are exchanging or otherwise sharing sector loading information for a given mobile station 12 can also use that information for another mobile station 12 that has both those sectors in its active set. The signal quality information, however, is specific to each mobile station 12 because it corresponds to the received signal quality measured by each given mobile station 12 for each given radio sector in that mobile station's active set.

Because the information sharing illustrated in the signal flow diagram of FIG. 3 brings with it additional overhead, one or more embodiments of the present invention use triggered rather than periodic information sharing. For example, as is described later herein, the mobile station 12 can be configured to send signal quality reports not only for its serving sector, which is customary for high-speed service in cdma2000 networks, but also for its non-serving sectors. Such information can be sent by way of a "special" signal quality reporting message, which may be sent by the mobile station 12 as a Pilot Strength Measurement Message (PSMM) that is not sent periodically, but rather is sent whenever the mobile station 12 wants to change its serving sector.

Figure 4:
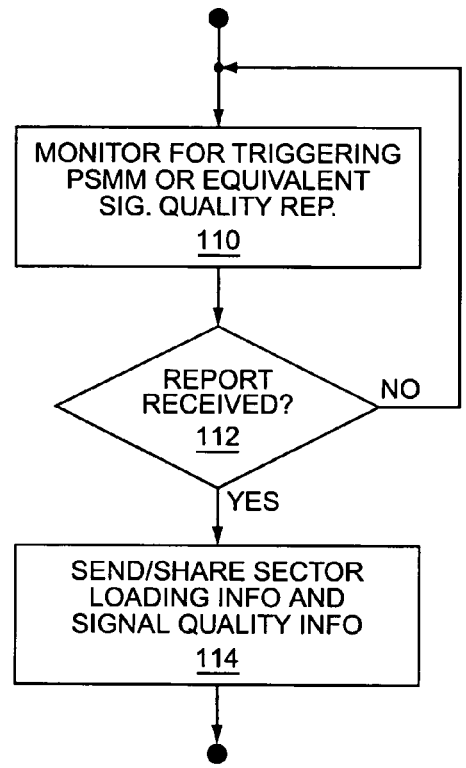
FIG. 4 is a diagram of triggered information sharing processing logic.

FIG. 4 illustrates triggered information sharing, wherein network 10—e.g., the RBSs 22—monitor for receipt of the special PSMM or equivalent signal quality reporting message from the mobile station 12 (Step 110). Whatever processing is ongoing to support the network's communication operations continues until the report is received (Step 112). At that point, the mobile station's active set sectors send/share the relevant sector loading information (and signal quality information, if that information is not received from the mobile station 12 at all such sectors) (Step 114). The special signal quality report can be sent from mobile station 12 in advance of its signaling a desired sector selection change, or in conjunction with signaling that desired change. Indeed, the triggered information sharing can be performed responsive to recognizing that the mobile station 12 desires a sector change.

Figure 5:
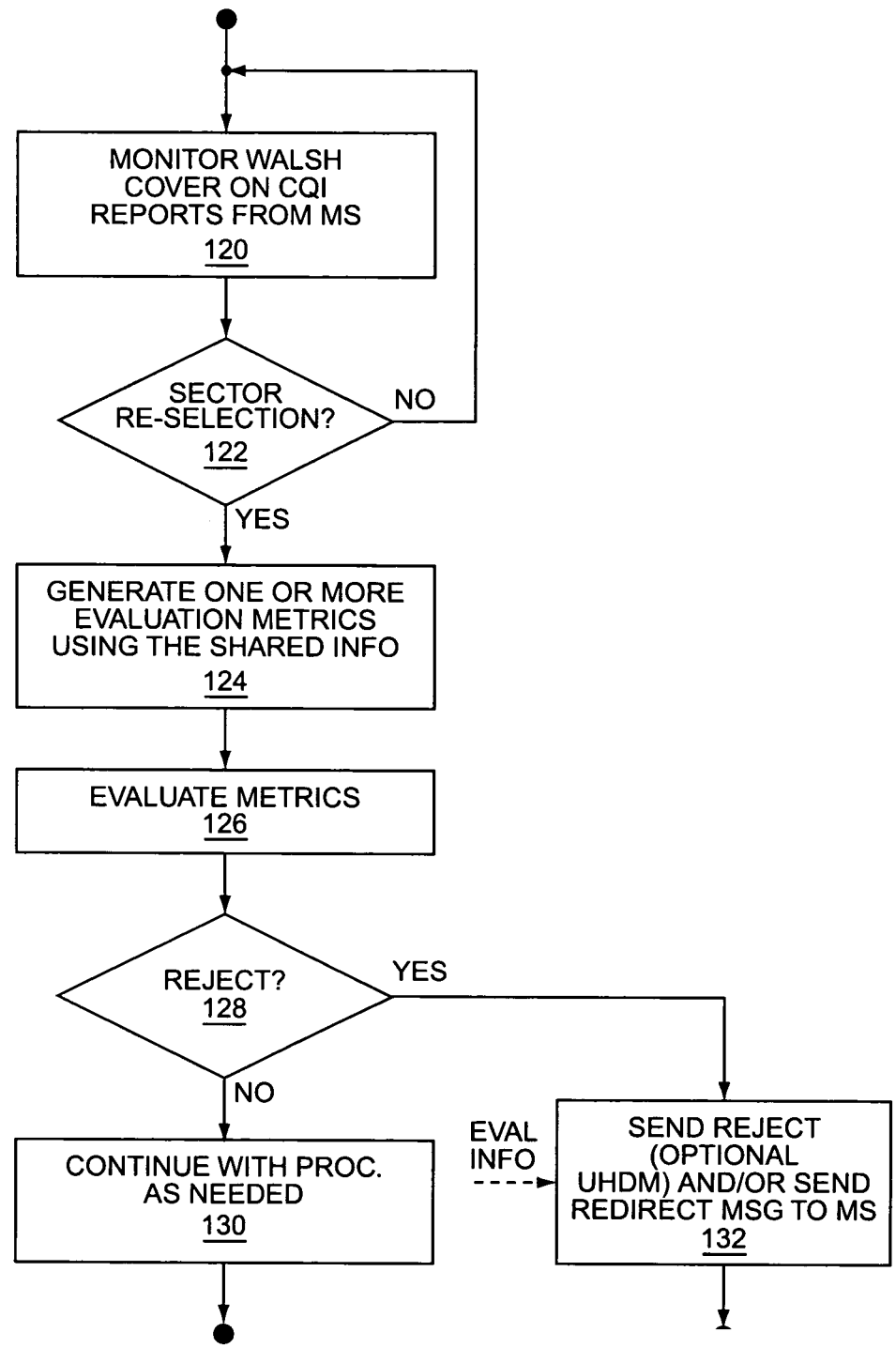
FIG. 5 is a diagram of sector selection request processing logic in a cdma2000 embodiment of the present invention.

FIG. 5 illustrates one method of recognizing and responding to such sector change indications from the mobile station 12 in the context of cdma2000. Processing begins with one or more of the RBSs 22 associated with the mobile station's active set monitoring the Walsh code cover placed on the mobile station's CQI reports. Generally, in cdma2000, each mobile station sends CQI reports to its currently designated serving sector at a high rate e.g., 800 Hz—and the RBS 22 providing that serving sector sets the F-PDCH data rate used to serve the mobile station 12 based on those CQI reports. All RBSs 22 in the mobile station's active set receive the CQI reports, but unless the Walsh cover placed on those reports matches their RBS-specific value, they are not decoded. However, when the mobile station 12 wants to change its serving sector, it begins covering its CQI reports with alternating Walsh codes corresponding to the source and target sectors. Walsh cover changes therefore represent one type of sector selection request sent from mobile stations 12.

Processing begins in FIG. 5 with at least the source sector RBS 22 monitoring the Walsh cover(s) on a given mobile station's CQI reports (Step 120). If the Walsh covers indicate sector reselection by the mobile station 12 (Step 122), the source (or target) RBS 22 generates one or more evaluation metrics using shared per-sector information (Step 124). It evaluates those metrics (Step 126), and determines whether to accept or reject the selection request by the mobile station 12 based on that evaluation (Step 128).

If the selection request is accepted, sector selection/switching processing is carried out as needed (Step 130). For example, if the sector reselection is accepted, the network 10 simply may arrange for the transfer of the mobile station's packet data traffic from the F-PDCH of the source sector to the F-PDCH of the target sector, without explicitly indicating to the mobile station 12 that the sector reselection is accepted.

However, if the sector reselection is not accepted, the network 10 may implicitly or explicitly signal the rejection (Step 132). If the reselection is rejected, the mobile station 12 figuratively may remain where it is, and continue receiving high-speed packet data service from its current serving sector. However, the reception conditions that drove it to request a different serving sector may persist, and it is not unlikely that the mobile station 12 will continue requesting sector reselections.

To limit this behavior, the mobile station 12 can be configured with a minimum repeat delay for sending the same sector selection request, but such a delay potentially interferes with the objective of allowing the mobile station 12 generally to optimize its high-speed packet data service by quickly adjusting its serving sector selection. As an alternative, if the network 10 wishes to reject the mobile station's sector selection request, it may remove a sector from the mobile station's active set by sending a Universal Handoff Directive Message. With the sector removed, it is no longer a candidate for serving the mobile station 12 and, by definition, the mobile station 12 will no longer target the removed sector.

Additionally, rather than simply rejecting the request, the network 10 can be configured to make an intelligent redirection of the mobile station 12. That is, the shared information can be evaluated for the involved sectors, and the sector that currently is the "best" one for serving the mobile station 12 can be identified. The mobile station 12 can then be redirected to the identified sector, so that it becomes the mobile station's new serving sector rather than the sector targeted in the request message.

One or more metrics can be used in evaluating which one of the candidate sectors represents the "best" serving sector. For example, identifying the best serving sector may comprise determining which sector would provide the mobile station 12 with the highest data throughput, or determining whether the mobile station would receive higher packet data throughput in another one of the sectors as compared to the sector identified by the sector-selection request. Alternatively, the best sector can be selected based on evaluating the shared sector loading information and signal quality information to determine whether resource utilization efficiency would be improved by serving the mobile station in another one of the sectors as compared to the sector identified by the sector-selection request.

As a further alternative, the best sector can be identified based on evaluating the shared sector loading information and signal quality information to determine whether sector congestion would be reduced by serving the mobile station in another one of the sectors as compared to the sector identified by the sector-selection request. Further, the decision may be based on determining whether the network's communication resources would be more efficiently utilized by directing the mobile station 12 to a particular one of the involved sectors. Of course, the present invention contemplates a number of variations regarding the goal or goals to be furthered in accepting or rejecting sector selection requests from the mobile stations 12, and, optionally, in redirecting mobile stations 12 to sectors other than those targeted by them in their requests.

Figure 6:
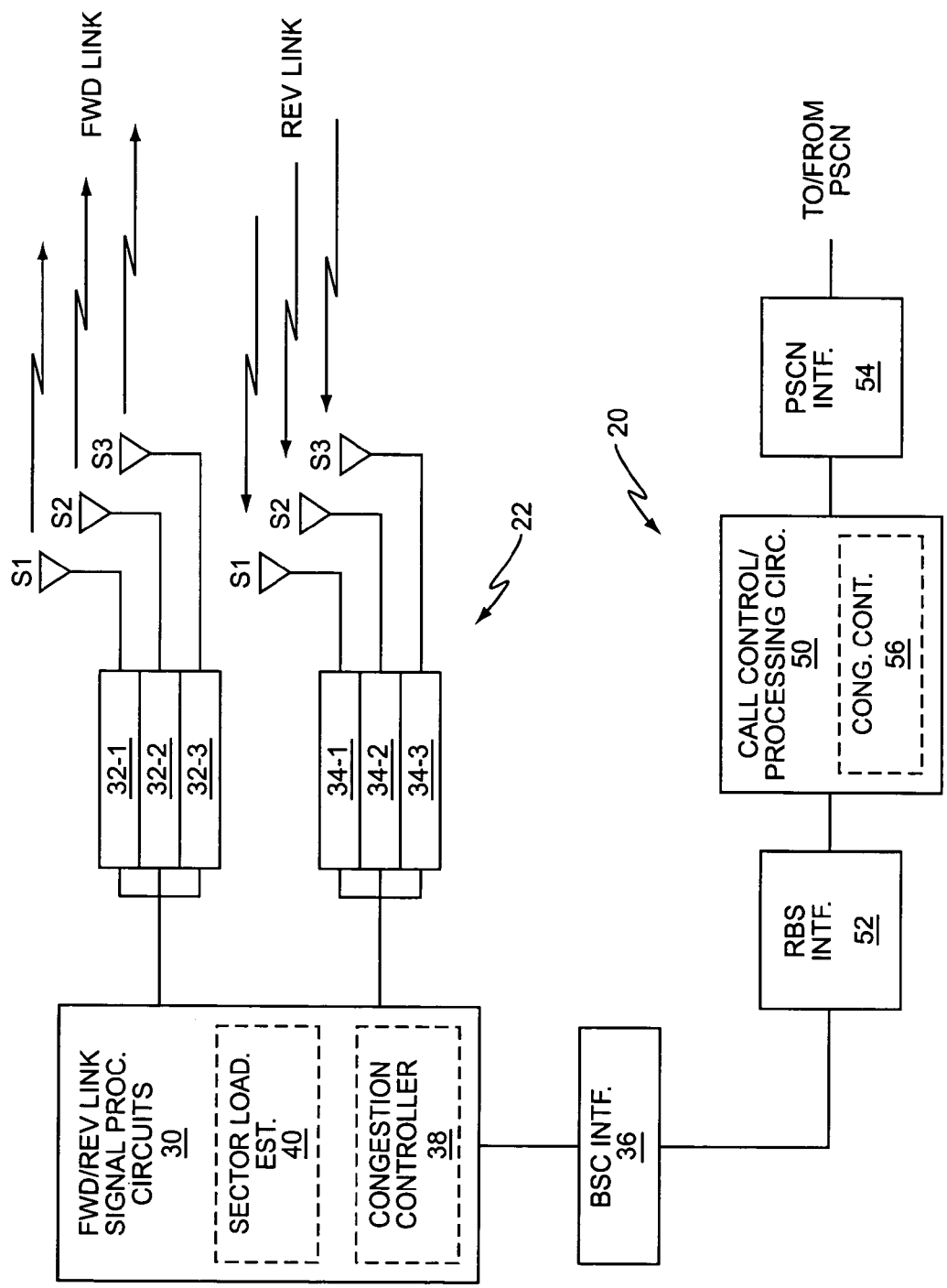
FIG. 6 is a diagram of functional circuit details for the radio base stations and base station controller of FIG. 1.

Although the particular information shared or the particular processing logic used to carry out the intelligent accept/reject processing of the present invention may favor one location or another, it should be understood that the inventive decision processing may be made at the RBS-level, at the BSC-level, or by using some combination of RBS and BSC processing. FIG. 6 illustrates functional RBS and BSC circuit details supporting RBS-level and/or BSC-level processing.

The illustrated RBS 22 comprises forward/reverse link signal processing circuits 30, sectorized transmitter circuits 32-1, 32-2, and 32-3, sectorized receiver circuits 34-1, 34-2, and 34-3, and a BSC interface circuit 36. For RBS-level accept/reject processing, the signal processing circuits 30 can be configured to include a congestion controller circuit 38. In one or more embodiments, the congestion controller circuit 38 is configured to manage radio sector congestion by evaluating sector loading information and signal quality information for a set of sectors responsive to a sector-selection request from a given mobile station 12, and accepting or rejecting the sector-selection request based on evaluating the shared sector loading information and signal quality information.

The congestion controller circuit 38 may include or be associated with a sector loading estimator circuit 40 supporting estimation of sector loading conditions for the radio sectors provided by the RBS 22. Loading and signal quality information from radio sectors not located at RBS 22 may be received through the BSC interface circuit 36, for example.

The illustrated BSC 20 comprises call control and processing circuits 50, a RBS interface circuit 52, and a PSCN interface circuit 54, which may include Packet Control Functions for managing the R-P interface between the BSC 20 and the PSCN 18. Because of its positioning in the network hierarchy, the BSC 20 represents an exemplary entity for carrying out the accept/reject processing of the present invention. That is, it provides a centralized processing location of the shared per-sector information, and represents a convenient location for consolidating the per-sector information sent from each RBS 22 operating under the BSC 20. To that end, the processing circuits 50 may be configured to include a congestion controller 56 that performs accept/reject processing in accord with one or more of the embodiments described herein.

Figure 7:
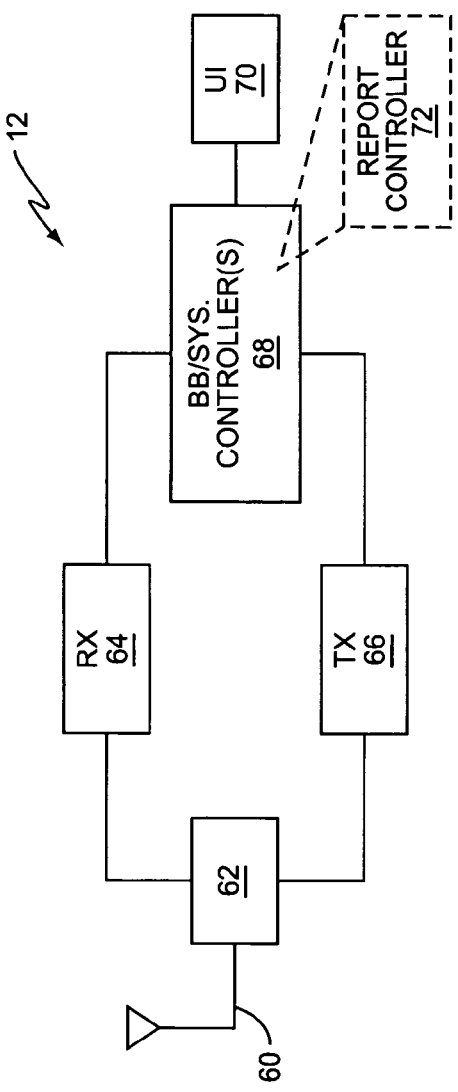
FIG. 7 is a diagram of a mobile station according to one or more embodiments of the present invention.
Figure 8:
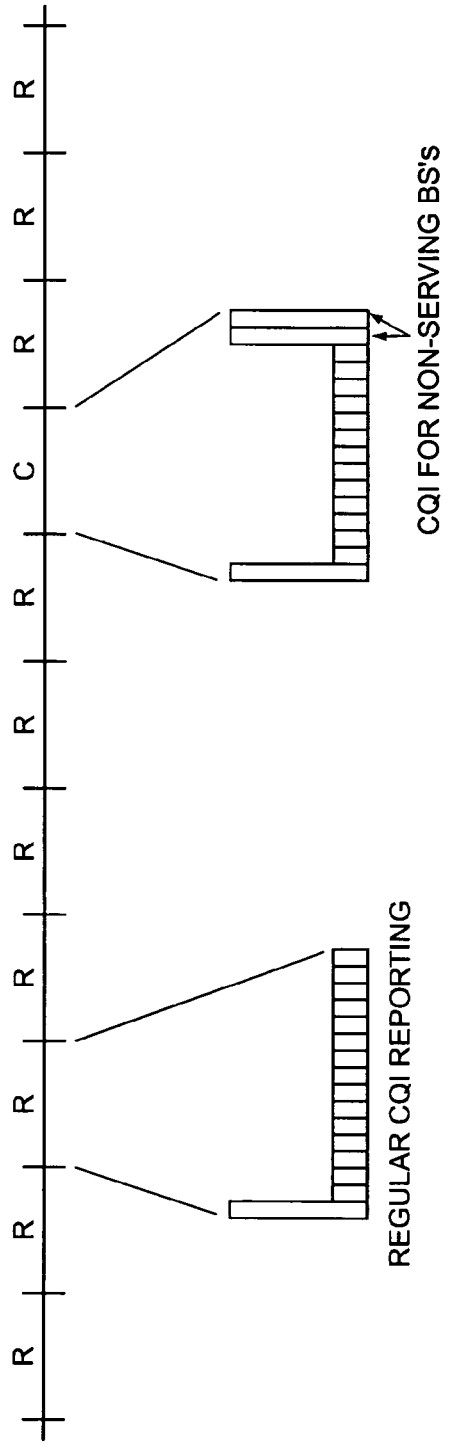
FIG. 8 is a diagram of signal quality reporting logic according to at least one configuration of the mobile station of FIG. 7.

Finally, FIG. 7 completes the functional circuit illustrations by showing one embodiment of the mobile station 12 that is configured for signal quality reporting in accordance with one or more embodiments of the present invention. FIG. 8 illustrates one method contemplated by the present invention, whereby the mobile station 12 illustrated in FIG. 7 is configured to send CQI reports for non-serving sectors, as well as for its serving sector.

The illustrated mobile station 12 comprises an antenna 60, a switch/duplexer 62, a radiofrequency (RF) receiver circuit 64, a RF transmitter circuit 66, baseband/system controller(s) 68, and a user interface (UI) 70, which may include a keypad, a display, and audio input/output devices, depending on the intended use of the mobile station 12. (It should be understood that the term "mobile station" is given broad meaning herein, and includes but is not limited to cellular radiotelephones, Portable Digital Assistants (PDAs), palmtop/laptop computers, and like portable devices having two-way radio communication capability.

The baseband/system controller(s) 68, which may comprise one or more microprocessor-based circuits and/or digital signal processing circuits can be configured to include a signal quality report controller 72 that generates CQI reports in accord with the logic of FIG. 8.

In that illustration, one sees that the mobile station 12 sends a full CQI report in the first slot of a regular CQI reporting interval, followed by differential CQI reports in successive time slots of that same interval. The regular reporting interval (denoted as an interval "R" in the diagram) provides the serving-sector RBS 22 with the channel quality information need to set the serving data rate for packet data being transmitted to the mobile station 12. However, in support of the intelligent sector selection accept/reject decision making of the present invention, the mobile station 12 provides CQI values—e.g., full CQI reports—for its non-serving sectors as well. (In the illustration, one of the "R" reporting intervals periodically is given over for use as a "C" reporting interval, in which the mobile station provides a full CQI report for its serving sector, but forfeits some of the time slots in that interval for sending full CQI reports for one or more of its non-serving sectors.)

For cdma2000 embodiments, the non-serving sector CQI reports can be sent on the mobile station's Reverse Packet Data Control Channel (R-PDCCH), for example. The non-serving sector CQI values preferably use some form of filtering so that smoothed (averaged) channel quality values for the non-serving sectors are provided by the mobile station 12. In some embodiments, CQI reports are sent only for the next one or two best non-serving sectors—i.e., the non-serving sectors can be ranked in terms of received signal quality and reports for the top one or two can be sent. Alternatively, CQI values for all non-serving sectors in the set can be sent.

Since the periodicity of non-serving sector reports can be set relatively low—e.g., 1/64th or 1/128th of the serving sector report periodicity—the overhead associated with reporting CQI values for the non-serving sectors is low. However, even a low-rate reporting interval for non-serving sector CQI values typically will be much faster than the PPSMMs sent by the mobile station 12. Thus, the benefit of sending even low-rate non-serving sector CQI values can be significant in terms of enabling better accept/reject decision making.

Broadly, the present invention contemplates making intelligent accept/reject decisions responsive to receiving serving sector selection requests from the mobile stations being supported on a high-speed packet data channel offered in a plurality of radio sectors within a given wireless communication network. The decision-making process can be predicated on controlling network congestion, such as by denying selection requests that target already-congested radio sectors, and can further aid congestion control by redirecting mobile stations to sectors where they would enjoy higher data throughput, or where the network's limited resources would be more efficiently used.

As noted, the present invention applies to a variety of network types, including cdma2000 and W-CDMA networks; the ability to make sector selection accept/reject/redirect decisions intelligently does not depend the type of network, but rather on the sharing or distribution of signal quality and loading information for the sectors associated with the decision-making process. Thus, the present invention is not limited by the foregoing discussion nor by the accompanying drawings, but rather it is limited only by the following claims and their reasonable legal equivalents.

What is claimed is:

1. A method of controlling sector congestion by managing autonomous sector selections by a mobile station being served on a shared high-speed packet data channel, the method comprising:

serving the mobile station on the shared high-speed packet data channel from only one radio sector at a time;

sharing sector loading information and signal quality information among a set of radio sectors in a wireless communication network that are candidates for serving the mobile station on the shared high-speed packet data channel, wherein said signal quality information corresponds to per-sector received signal quality measurements made by the mobile station, and wherein the set of radio sectors includes sectors from at least two radio base stations; and selectively rejecting an autonomous sector-selection request from the mobile station based on evaluating the shared sector loading information and signal quality information, said sector-selection request targeting a given one of the candidate radio sectors for serving the mobile station on the shared high-speed packet data channel.

2. The method of claim 1, further comprising, if the sector-selection request is rejected for a given sector in the set, sending redirect information to the mobile station indicating another one of the sectors in the set as a more preferred selection target for the mobile station.

3. The method of claim 1, further comprising determining the set of sectors based on the mobile station's active set, wherein the mobile station's active set represents those radio sectors that currently are candidates for serving the mobile station on the shared high-speed packet data channel.

4. The method of claim 1, wherein sharing sector loading information among the set of radio sectors comprises sharing sector-specific values comprising one or more of a transmit power availability for the shared high-speed packet data channel, a spreading code availability for the shared high-speed packet data channel, and scheduler type information for the shared high-speed packet data channel.

5. The method of claim 1, wherein sharing sector loading information among the set of radio sectors comprises sharing the sector loading information responsive to receiving a sector-selection request from the mobile station.

6. The method of claim 5, wherein the wireless communication network comprises a cdma2000-based network providing a Forward Packet Data Channel (F-PDCH) as the shared high-speed packet data channel, and wherein receiving a sector-selection request from the mobile station comprises receiving a Walsh cover change signal in association with Channel Quality Information (CQI) reports being sent from the mobile station for a currently selected serving sector in the set.

7. The method of claim 1, wherein selectively rejecting a sector-selection request by the mobile station based on evaluating the shared sector loading information and signal quality information comprises determining whether the mobile station would receive higher packet data throughput in another one of the sectors as compared to the sector identified by the sector-selection request.

8. The method of claim 1, wherein selectively rejecting a sector-selection request by the mobile station based on evaluating the shared sector loading information and signal quality information comprises determining whether resource utilization efficiency would be improved by serving the mobile station in another one of the sectors as compared to the sector identified by the sector-selection request.

9. The method of claim 1, wherein selectively rejecting a sector-selection request by the mobile station based on evaluating the shared sector loading information and signal quality information comprises determining whether sector congestion would be reduced by serving the mobile station in another one of the sectors as compared to the sector identified by the sector-selection request.

10. The method of claim 1, wherein sharing sector loading information and signal quality information among a set of radio sectors in a wireless communication network comprises consolidating the sector loading and signal quality information for the sectors in the set at one or more base station controllers supporting the set of radio sectors.

11. The method of claim 10, wherein selectively rejecting a sector-selection request by the mobile station based on evaluating the shared sector loading information and signal quality information comprises evaluating the shared sector loading information and signal quality information at the one or more base station controllers, determining whether to selectively-reject the sector-selection request at the one or more base station controllers, and communicating the decision of whether to selectively reject the sector-selection request to one or more of the radio sectors in the set.

12. The method of claim 1, wherein sharing sector loading information and signal quality information among a set of radio sectors in a wireless communication network comprises communicating between respective ones of the radio sectors, so that each radio sector in the set has shared information for the other radio sectors in the set, consolidating the sector loading and signal quality information for the sectors in the set at one or more base station controllers supporting the set of radio sectors.

13. The method of claim 12, wherein selectively rejecting a sector-selection request by the mobile station based on evaluating the shared sector loading information and signal quality information comprises evaluating the shared sector loading information and signal quality information at the one or more base station controllers, determining whether to selectively reject the sector-selection request at the one or more base station controllers, and communicating the decision of whether to selectively reject the sector-selection request to one or more of the radio sectors in the set.

14. A method of controlling sector congestion in a wireless communication network comprising:
serving a given mobile station on a shared high-speed packet data channel from only one radio sector at a time, to provide high-speed packet data service to the mobile station;
sharing sector loading information among a given set of radio sectors that are candidates for providing the shared high-speed packet data service on the shared high-speed packet data channel to the mobile station, wherein the set of radio sectors includes sectors from at least two radio base stations; and
selectively rejecting an autonomous serving sector selection request by the mobile station targeting a particular one in the set of sectors for serving the mobile station on the shared high-speed packet data channel, based on evaluating the sector loading information.

15. The method of claim 14, wherein sharing sector loading information among the given set of radio sectors comprises sharing sector loading information between different radio base stations via one or more base station controllers associated with the different radio base stations.

16. The method of claim 15, further comprising sending sector loading information from respective ones of the radio base stations for said sharing responsive to the mobile station sending the serving sector selection request.

17. A congestion control circuit for use in a wireless communication network providing high-speed packet data service to mobile stations on a per-radio sector basis, wherein the wireless communication network provides the high-speed packet data service to a given mobile station by serving the mobile station on a shared high-speed packet data channel from only one radio sector at a time, and wherein the congestion control circuit is configured to manage radio sector congestion by:
evaluating sector loading information and signal quality information for a set of sectors responsive to an autonomous sector-selection request from the mobile station targeting one of the sectors in the set as a new serving sector for serving the mobile station on the shared high-speed packet data channel, said set of sectors comprising candidate sectors for providing the high-speed packet data service to the mobile station, and said signal quality information comprising per-sector received signal quality measurements made by the mobile station for the set of sectors; and
selectively rejecting the sector-selection request based on evaluating the shared sector loading information and signal quality information;
wherein the set of radio sectors includes sectors from at least two radio base stations.

18. The congestion control circuit of claim 17, wherein the congestion control circuit comprises a processing circuit in a sectorized radio base station.

19. The congestion control circuit of claim 17, wherein the congestion control circuit comprises a processing circuit in a base station controller configured to control one or more sectorized radio base stations.

20. A radio base station for use in a wireless communication network, wherein the wireless communication network serves any given mobile station on a shared high-speed packet data channel from only one radio sector at a time, said radio base station providing a radio sector providing the shared high-speed packet data channel in that radio sector, and comprising a congestion control circuit configured to:
selectively reject autonomous sector-selection requests by mobile stations desiring service on the shared high-speed packet data channel in that radio sector, based on evaluating sector loading information for that radio sector and one or more other radio sectors in a set of radio sectors that are candidates for providing high-speed packet data channel service, one at a time, to the mobile stations;

wherein a given sector-selection request from a given mobile station targets a given candidate radio sector for serving the mobile station on the shared high-speed packet data channel; and wherein the set of radio sectors includes sectors from at least two radio base stations.

21. The radio base station of claim 20, wherein the congestion control circuit is additionally configured, if it rejects a sector-selection request from a given mobile station, to determine a more preferred radio sector for serving the given mobile station on the shared high-speed packet data channel, so that a redirect message can be sent to the mobile station indicating that more-preferred radio sector.

* * * * *